United States Patent
Guerra

(10) Patent No.: US 8,459,439 B2
(45) Date of Patent: Jun. 11, 2013

(54) HANDLING DEVICE FOR DRIVING, DIPPING AND TURNING MOTORVEHICLE AND VAN BODYWORKS, TRUCK CABINS AND METAL ARTICLE VESSELS INTO PROCESSING BASINS

(75) Inventor: Giancarlo Guerra, Milan (IT)

(73) Assignee: Geico S.p.A., Milan (IT)

( * ) Notice: Subject to any disclaimer, the term of this patent is extended or adjusted under 35 U.S.C. 154(b) by 854 days.

(21) Appl. No.: 12/449,945

(22) PCT Filed: Mar. 23, 2007

(86) PCT No.: PCT/IT2007/000213
§ 371 (c)(1),
(2), (4) Date: Dec. 8, 2009

(87) PCT Pub. No.: WO2008/126108
PCT Pub. Date: Oct. 23, 2008

(65) Prior Publication Data
US 2010/0086384 A1    Apr. 8, 2010

(30) Foreign Application Priority Data
Mar. 2, 2007    (IT) .............................. MI2007A0429

(51) Int. Cl.
*B62D 65/18*    (2006.01)
*B65G 47/22*    (2006.01)

(52) U.S. Cl.
USPC ................... 198/346; 198/377.02; 198/463.3; 198/465.4; 118/425; 118/426; 134/70; 134/124

(58) Field of Classification Search
USPC ............ 198/346, 346.3, 315, 377.01, 377.02, 198/465.3, 465.4, 468.01, 468.6, 406; 118/423, 118/425, 426, 428; 134/70, 124
See application file for complete search history.

(56) References Cited

U.S. PATENT DOCUMENTS 4,462,315 A * 7/1984 Wakabayashi ............. 104/172.4
5,364,469 A * 11/1994 Wakabayashi ................ 118/423

(Continued)

FOREIGN PATENT DOCUMENTS

| DE | 9408846 U1 | 9/1994 |
|---|---|---|
| EP | 1157960 A1 | 11/2001 |
| EP | 1408000 A2 | 4/2004 |
| JP | 2004283690 | 10/2004 |

OTHER PUBLICATIONS

PCT Search Report dated Jul. 11, 2007.

*Primary Examiner* — Mark A Deuble
(74) *Attorney, Agent, or Firm* — Hedman & Costigan, P.C.; James V. Costigan

(57) ABSTRACT

A device for driving, dipping and turning bodyworks of motor vehicles, vans, truck cabs and metal article vessels, into processing basin, and for withdrawing the above elements from the processing basins, comprises a slidable framework, which can slide on sliding rails, supporting a pair of arms bearing, at free end portions thereof, a swinging shaft adapted to bear a supporting skid for supporting a bodywork, the sliding framework comprising at least a winch driving a drum, for winding a rope coupled to a respective arm at the swinging shaft, the slidable framework further comprises at least a rack, therealong an end portion of the respective arms coupled to framework slides.

11 Claims, 11 Drawing Sheets

U.S. PATENT DOCUMENTS

| | | | | |
|---|---|---|---|---|
| 5,651,822 | A * | 7/1997 | Heckmann | 118/426 |
| 5,972,112 | A * | 10/1999 | Wood et al. | 118/423 |
| 6,991,064 | B2 * | 1/2006 | Ehrenleitner | 182/141 |
| 6,996,431 | B2 * | 2/2006 | Ben-Haim et al. | 600/407 |
| 7,134,541 | B2 * | 11/2006 | Matsubara et al. | 198/468.01 |
| 7,497,321 | B2 * | 3/2009 | Matsubara et al. | 198/465.4 |
| 2003/0116179 | A1 * | 6/2003 | Jarvis et al. | 134/95.3 |
| 2004/0101393 | A1 | 5/2004 | Lopez Alba | |

* cited by examiner

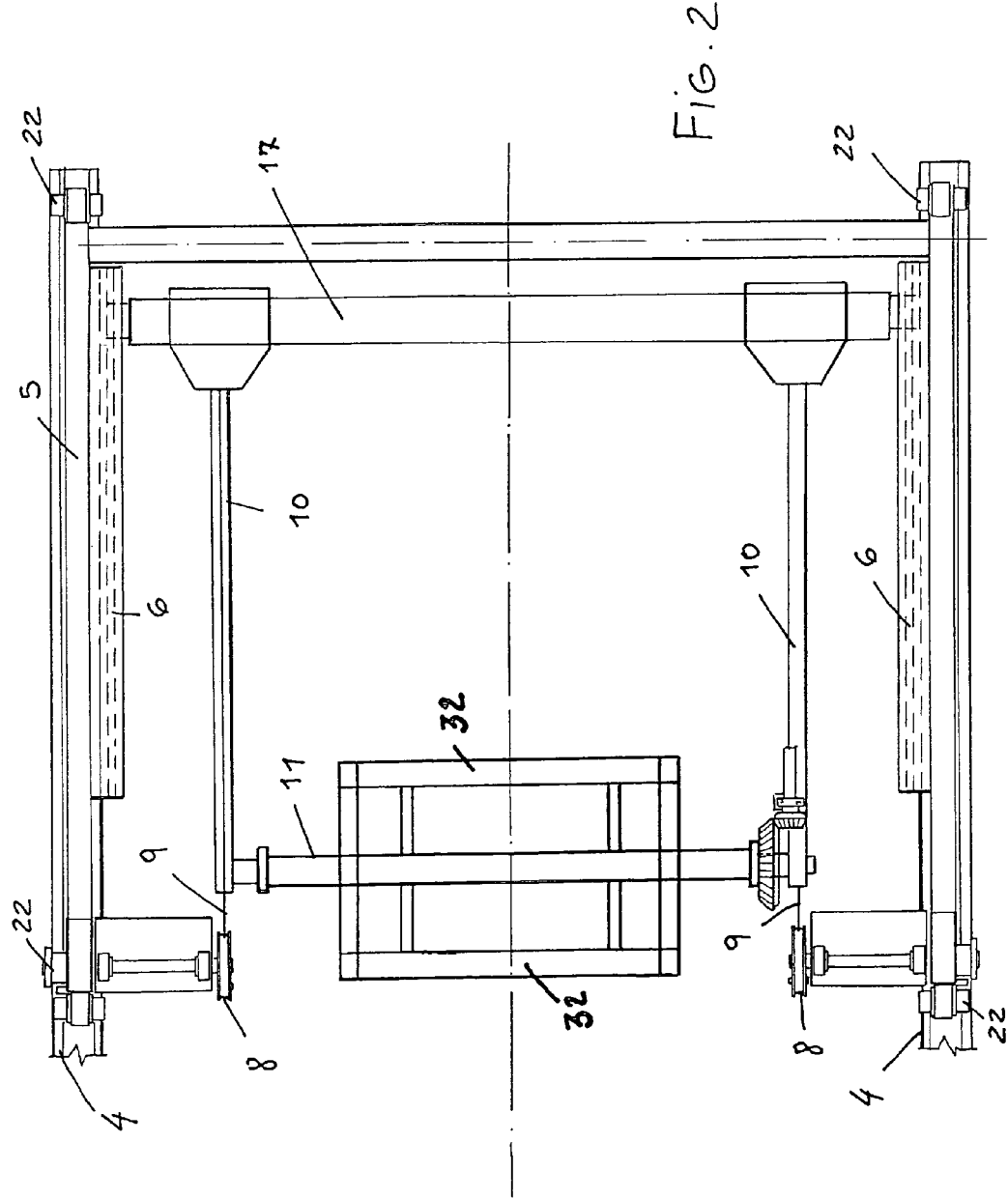

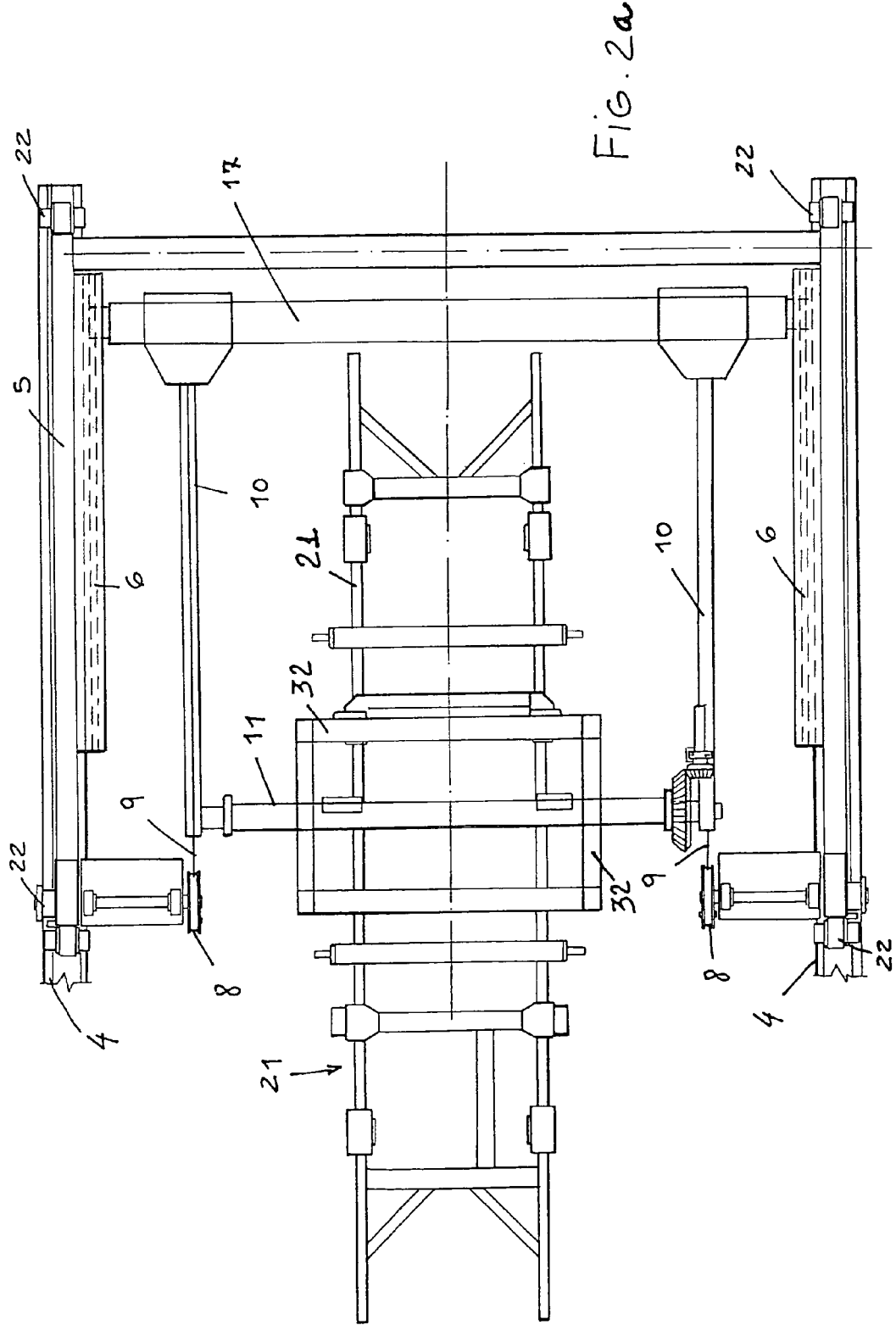

HANDLING DEVICE FOR DRIVING, DIPPING AND TURNING MOTORVEHICLE AND VAN BODYWORKS, TRUCK CABINS AND METAL ARTICLE VESSELS INTO PROCESSING BASINS

BACKGROUND OF THE INVENTION

The present invention relates to a handling device for driving, dipping and turning motor vehicle bodyworks into processing basins, and then for withdrawing the processed bodyworks from said processing basins.

More specifically, the device according to the present invention has been specifically designed for driving motor vehicle bodyworks as said bodyworks are processed by several processing operating steps.

As is known, motor vehicle bodyworks in general must be subjected to a lot of processing operations, including pre-processing steps, cataphoresis and sealing material, template and PVC application steps.

During the above mentioned operations, the bodyworks, each of which comprises a dedicated skid, must be loaded on the so-called "arch" or roller platforms, and then they must be connected to a swinging table or platform of the processing device.

The latter may be driven by a conveyor chain, including step by step type of latching means.

Thus, by using one or two conveyor chains, it is possible to drive several processing devices of the above mentioned type, which are held at a fixed or variable pitch from one another.

SUMMARY OF THE INVENTION

The aim of the present invention is to provide such a device for dipping, turning and withdrawing motor vehicle bodyworks into/from processing basins, where the motor vehicle bodyworks are either partially or fully turned to remove therefrom any undesired air bubbles susceptible to be present inside the bodyworks as said bodyworks are dipped into the processing basins.

Within the scope of the above mentioned aim, a main object of the invention is to provide such a device which also allows to easily and quickly perform sealing, masking and PVC applying operations on the motor vehicle bodyworks being processed.

Another object of the present invention is to provide such a device in which the above mentioned operations are performed at outer places, outside of the basin region, thereby allowing the operators, arranged on an underlying platform, to operate in an ergonomic posture, at a proper height and slanting.

Another object of the present invention is to provide such a device which allows gripping arms, for gripping the motor vehicle bodyworks, to be easily and quickly adjusted to a desired adjusting level.

Yet another object of the present invention is to provide such a device which also allows the motor vehicle bodyworks to be vertically arranged, in order to reduce the stacking pitch of said motor vehicle bodyworks, thereby reducing the distance from a bodywork to another as said bodyworks are stored and transferred.

According to one aspect of the present invention, the above mentioned aim and objects, as well as yet other objects, which will become more apparent hereinafter, are achieved by a handling device for driving, dipping and turning motor vehicle bodyworks into/from processing basins, characterized in that said handling device comprises a sliding framework which is slidably driven on sliding rails and supporting a pair of arms bearing, at respective free end portions thereof, a shaft having a tilting platform supporting a motor vehicle bodywork bearing skid, said sliding bodywork comprising either one or two winch assemblies driving a respective winding drum for winding a rope, belt, chain or the like, coupled to a respective arm at said swinging shaft, said sliding framework further comprising two racks therealong the end portions of said arms coupled to said framework slide.

BRIEF DESCRIPTION OF THE DRAWINGS

Further characteristics and advantages of the present invention will become more apparent hereinafter from the following detailed disclosure of a preferred, though not exclusive, embodiment of the invention which is illustrated, by way of an indicative, but not limitative, example, in the accompanying drawings, where:

FIGS. 2 and 2a are top plan views of the handling device, respectively without and with the motor vehicle bodywork supporting skid;

DESCRIPTION OF THE PREFERRED EMBODIMENTS

Figure 1:
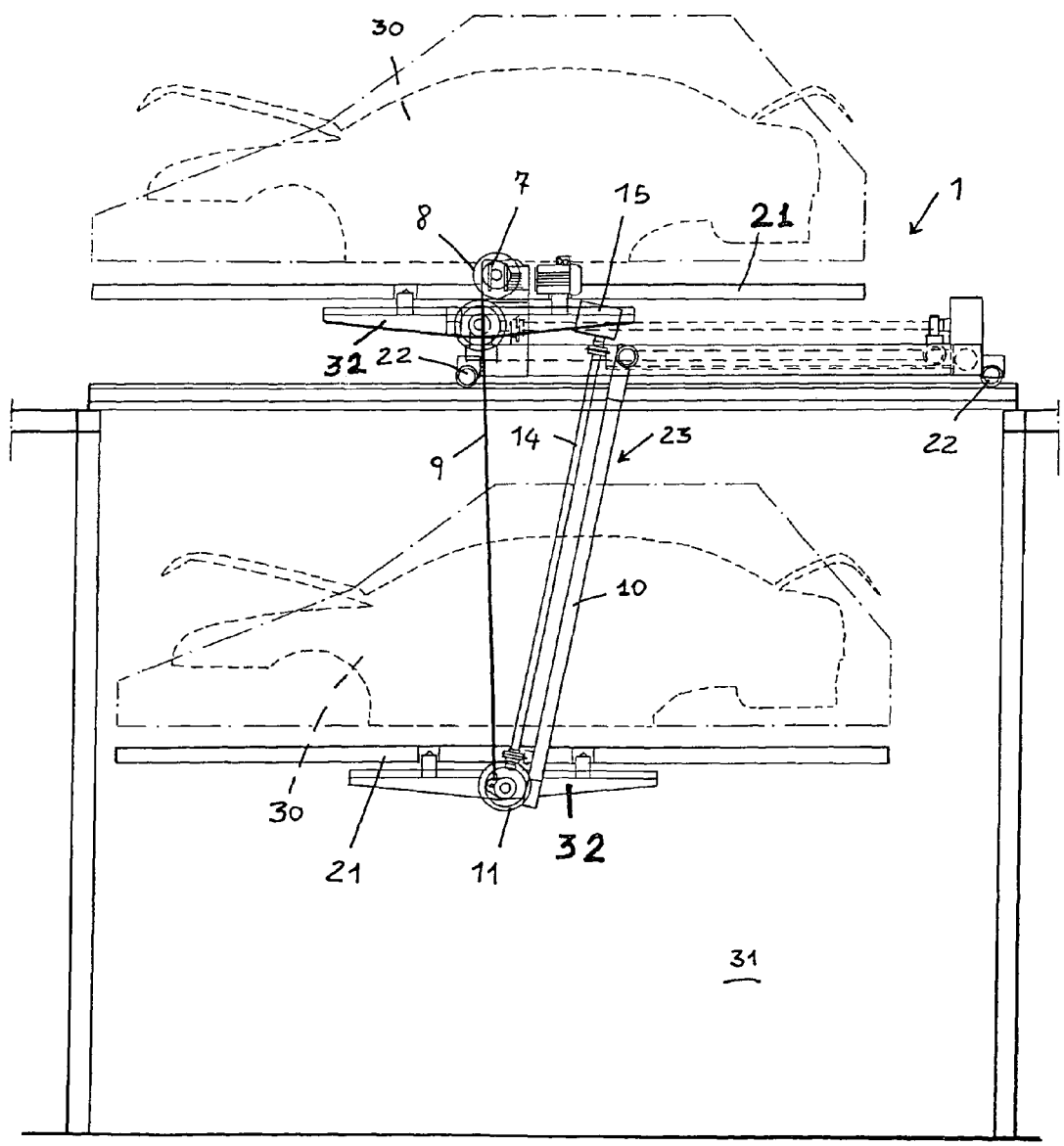
FIG. 1 is a side elevation view of the handling device according to the invention.
Figure 3:
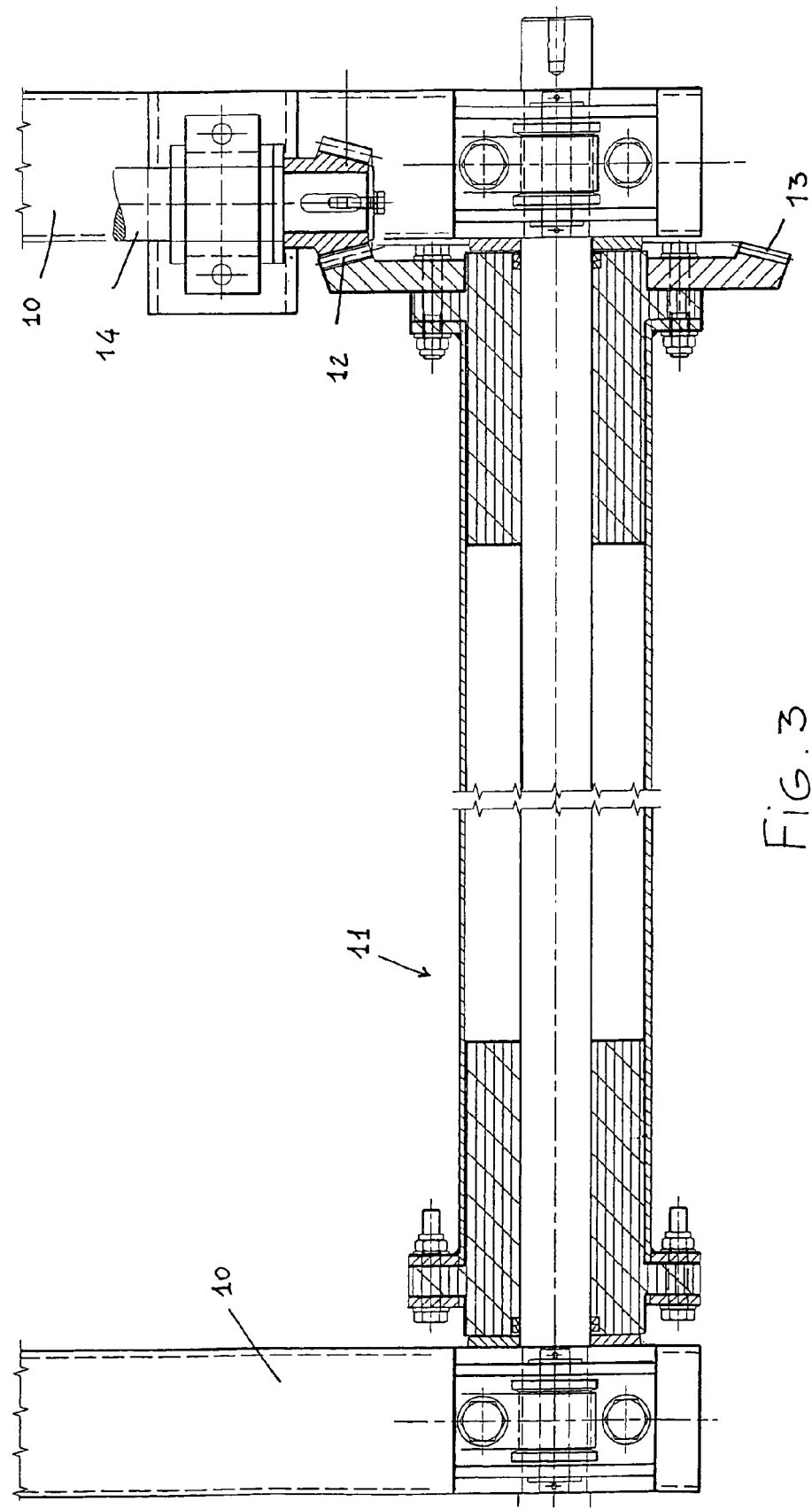
FIG. 3 is a front view, as longitudinally cross-sectioned, of the rotary shaft to which the tilting platform is connected.
Figure 4:
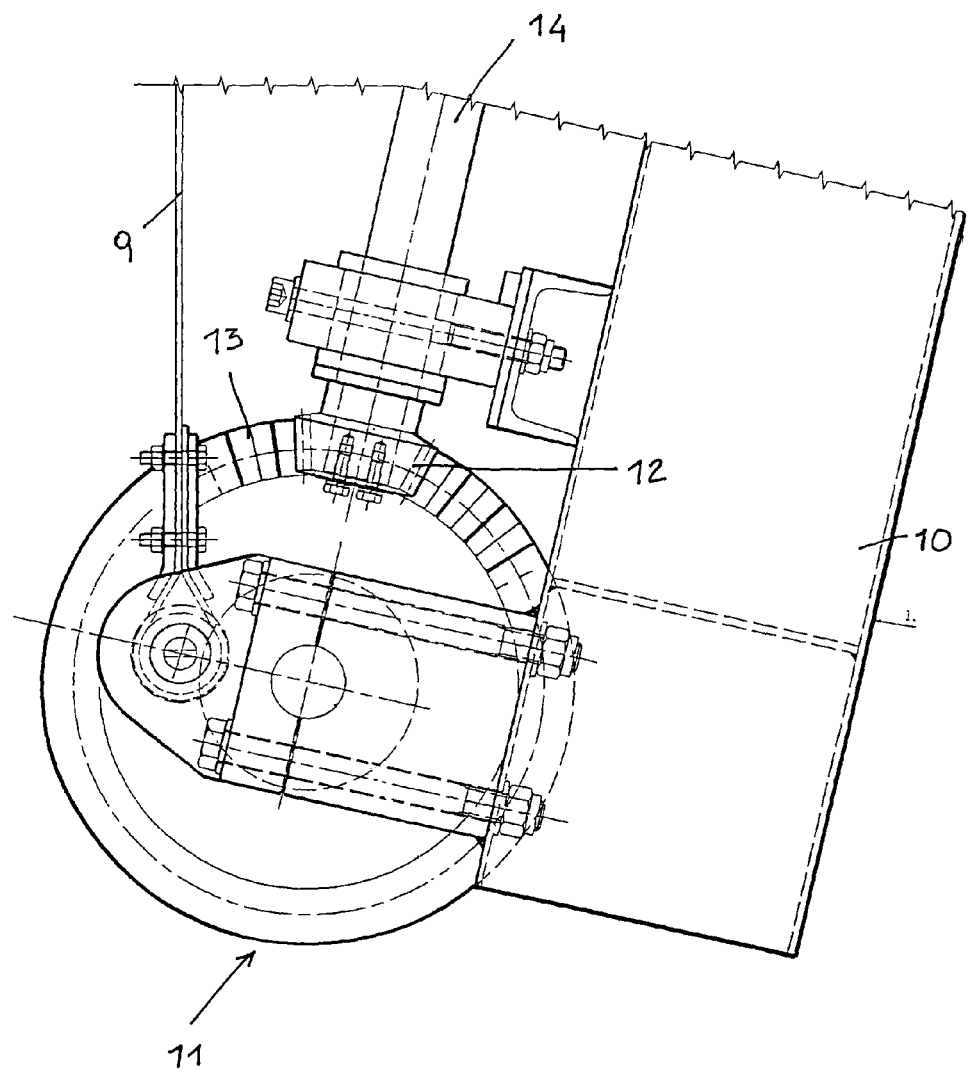
FIG. 4 is a further side view of the rotary shaft for tilting the motor vehicle bodyworks.
Figure 5:
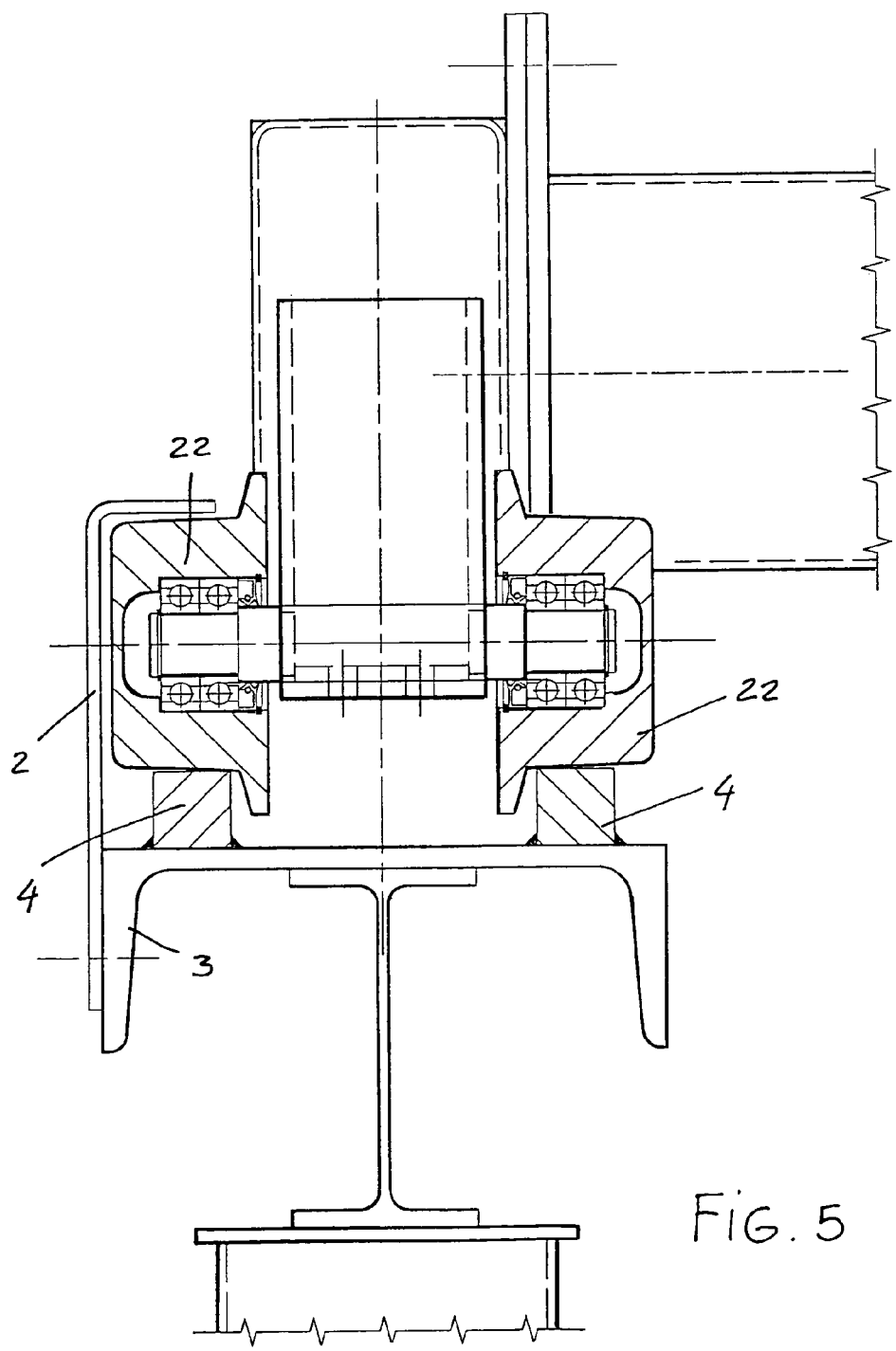
FIG. 5 is a cross-sectioned front view of the wheels included in the handling device and related sliding rails.
Figure 6:
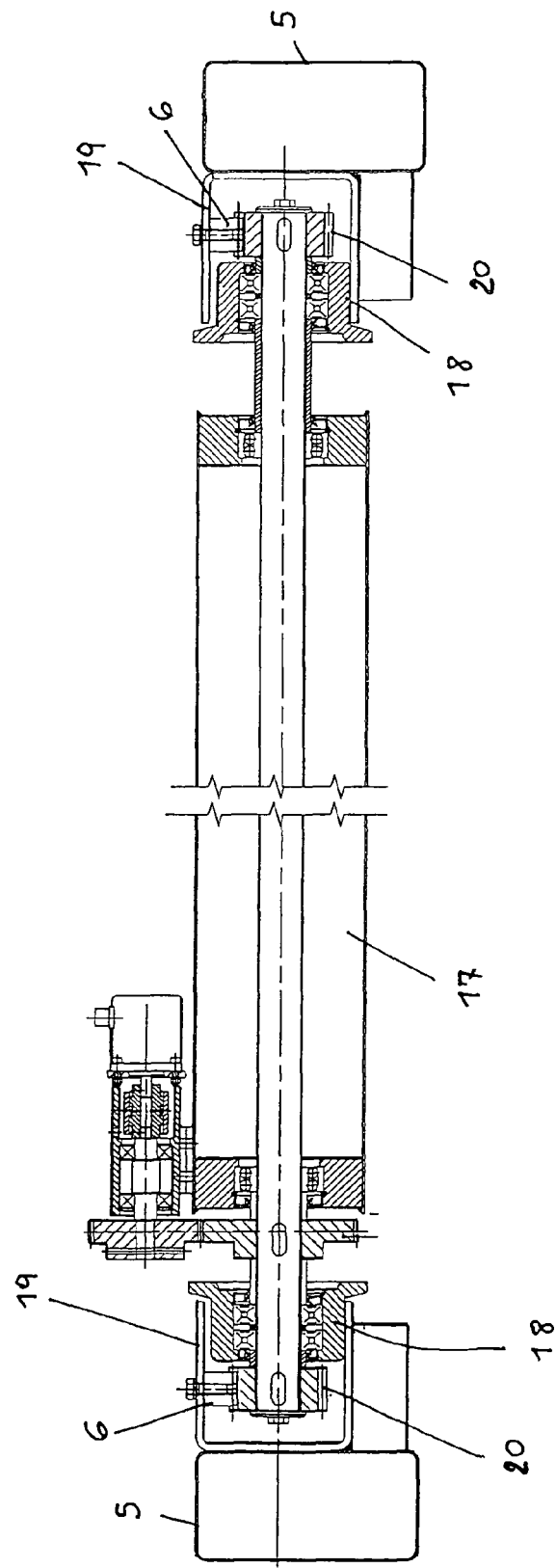
FIG. 6 is a further cross-sectioned front view of the arch rotary axis.

With reference to the number references of the above mentioned figures, the handling device according to the invention, which has been generally indicated by the reference number 1, comprises wheels preferably double-wheels, including an anti-tilting device 2 applied to the support 3 of the rails 4.

Said wheels 22 support a framework 5, of U-shape, in turn supporting two racks 6 and one or two winch assemblies 7, including motor reducing units.

Said winch assemblies 7 are designed for driving corresponding winding drums 8 for winding ropes, belts or chains 9, for raising and lowering a pair of arm or arch members 10.

Said arch members 10, at a top end portion thereof, can horizontally slide on the rack 6, to follow a reciprocating rectilinear movement.

To that end, said arch members 10 are coupled to a rotary axis 17, having, at the end portions thereof, sliding wheels 18 engaged in respective top guides 19.

At said sliding wheels 19, toothed gear or wheels 20, meshing with the respective racks 6, are arranged.

At the other end portions thereof, said arch members 10 support, at the junction of the belts, chains or ropes 9, a rotary shaft 11, coupled to a tilting platform 32 which is designed for turning, according to variable turning angles, as rotatively driven by the shaft 11 in turn rotatively driven by a bevel gear pair including the gears 12 and 13.

More specifically, the gear or pinion 12, meshes with the gear or ring 13 and being coupled to a driving shaft 14, driven by a motor reduced or geared unit 15.

As shown, on the tilting platform 32 coupled to the shaft 11 disarranged a skid 21 supporting a motor vehicle bodywork 30 to be processed inside the processing basin 31.

Figure 7:
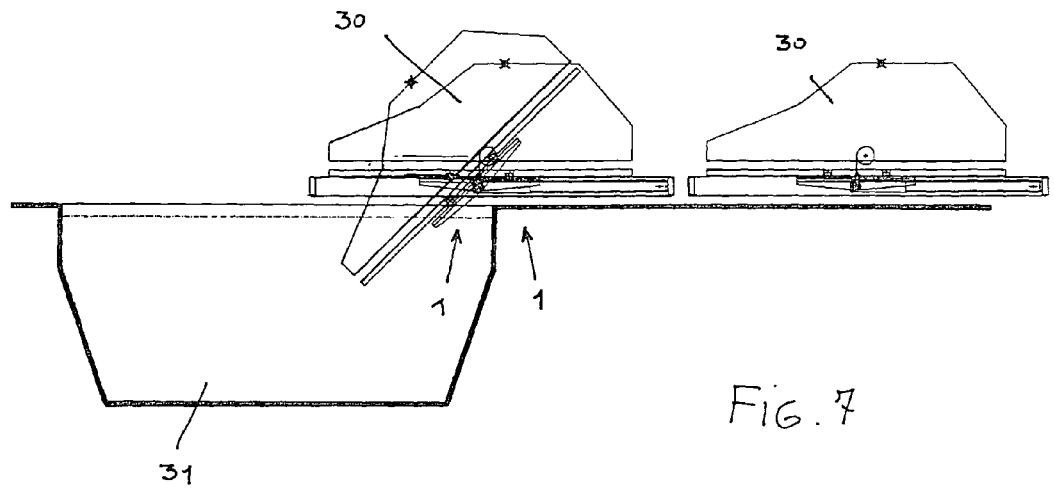
FIGS. 7 to 12 are schematic side views showing some operating steps of a dipping processing system including the handling device according to the present invention.
Figure 8:
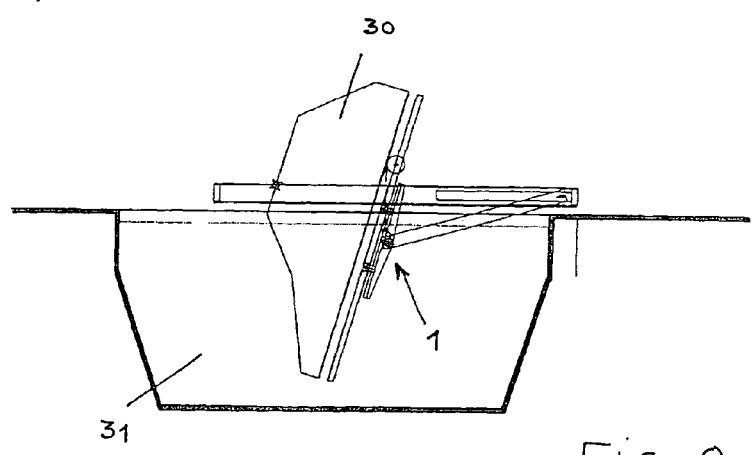
Figure 9:
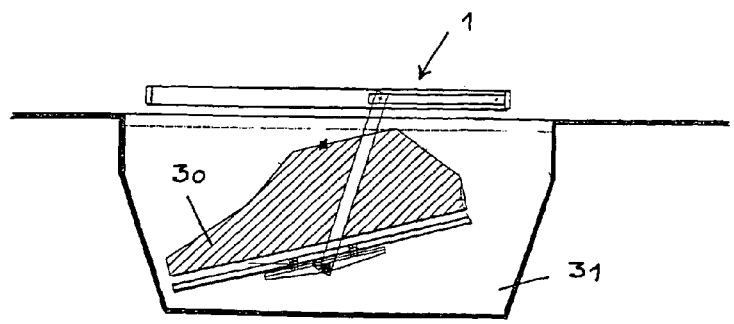
Figure 10:
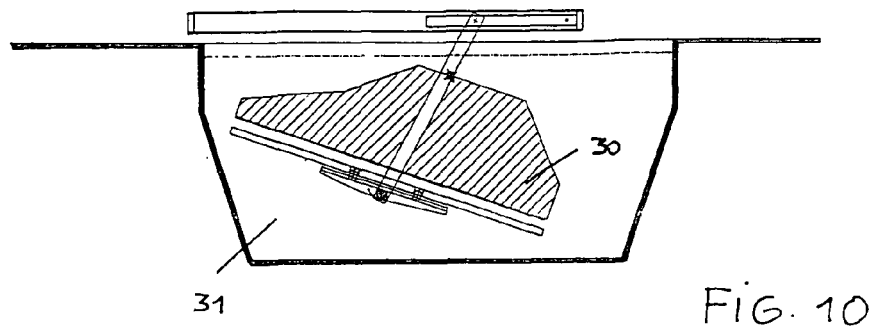
Figure 11:
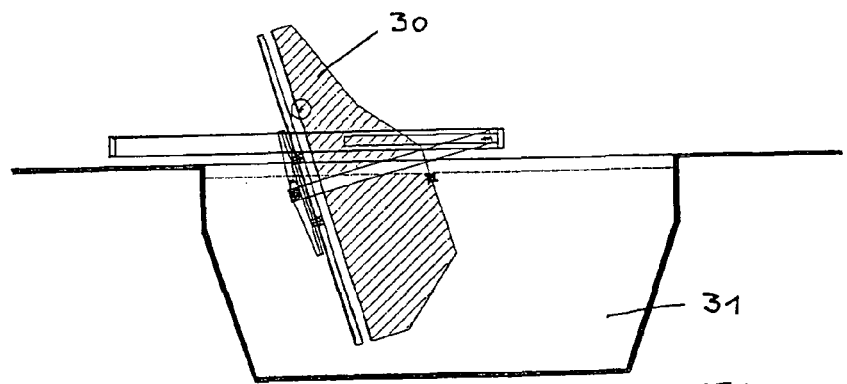
Figure 12:
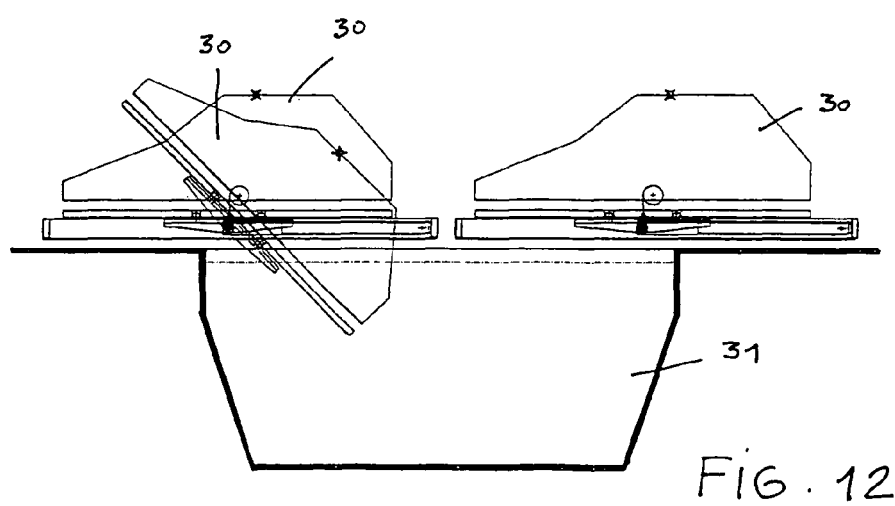

FIGS. 7 to 12 shows an example for handling and driving the motor vehicle bodywork 30 by using the handling device according to the present invention.

The mentioned ropes or belts 9, which are controlled by the respective drum members 8 in turn driven by the geared units of the winch assemblies 7, allow the arch members 10 to be lowered, thereby lowering the tilting platform 32 coupled to the rotary shaft 11 which, together with the platform 32, support the mentioned skid 21.

The racks 6 allows the arch members to be held in a parallel relationship during the handling thereof.

The tilting platform 32 shaft is rotatively driven by a driving system including the mentioned bevel pair in turn driven by the driving shaft 14, controlled or driven by the geared unit 15.

Figure 13:
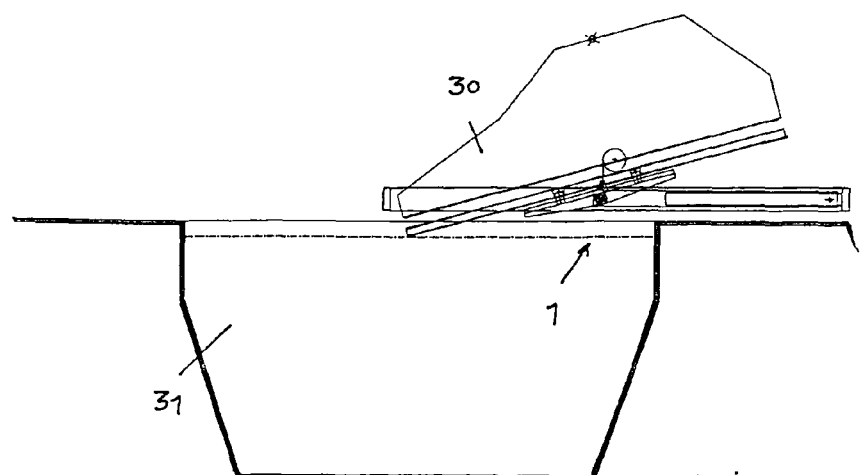
FIGS. 13 to 18 are further schematic side views, showing some operating steps of another dipping processing system including the handling device according to the present invention.
Figure 14:
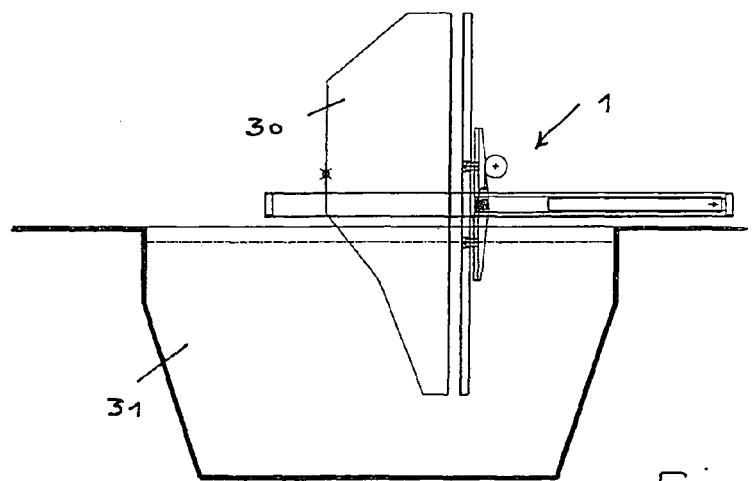
Figure 15:
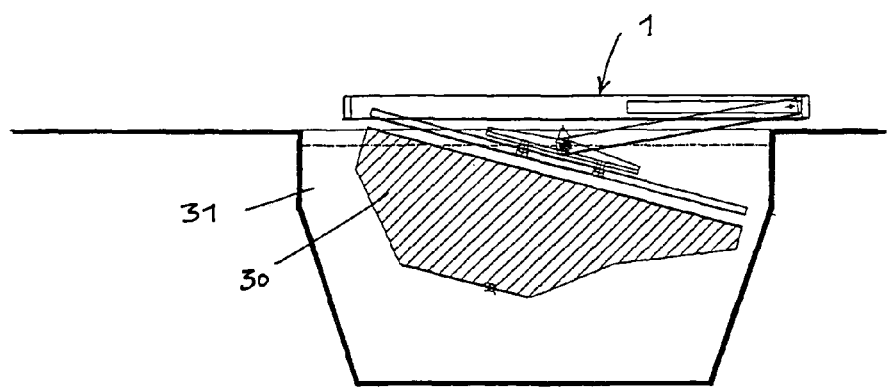
Figure 16:
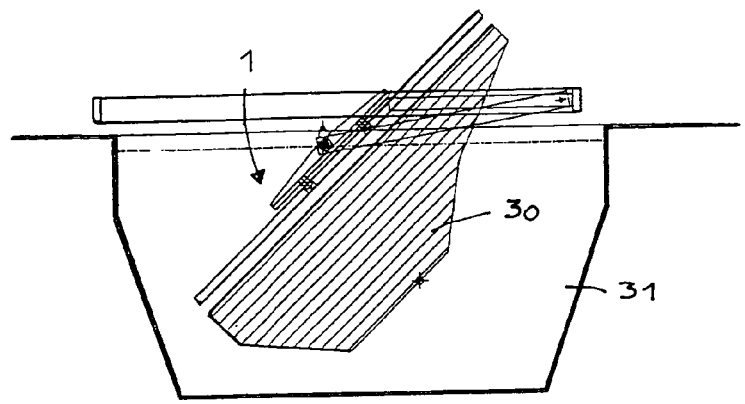
Figure 17:
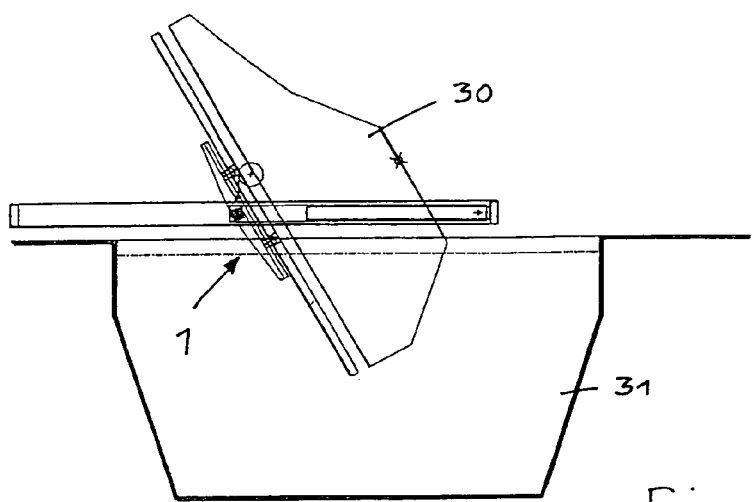
Figure 18:
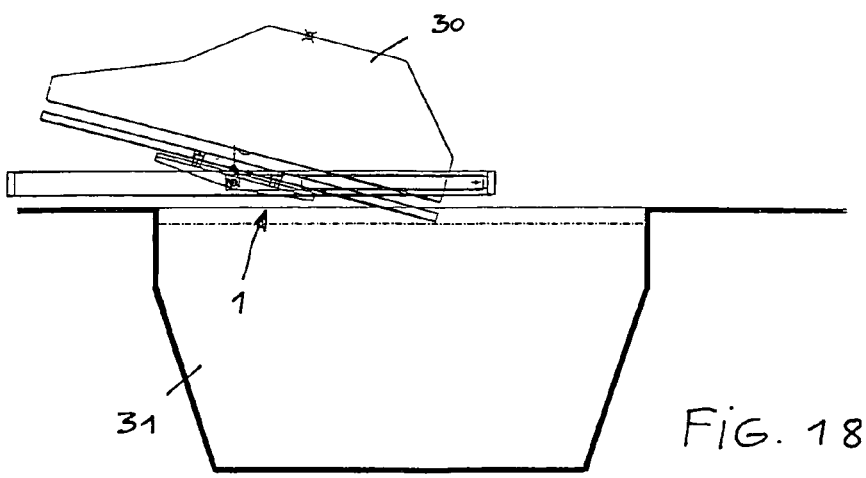

The above disclosed device allows to perform a very broad range of handling or movement operations, such as shown by way of an example in FIGS. 13 to 18, thereby allowing the motor vehicle bodywork 30 to be arranged either in a vertical position or in a tilted position.

Moreover, the disclosed device has a very small height.

Accordingly, it may be conveyed on a lower conveyor chain path, and optionally it can also be driven under the processing basins, to be driven again to the starting part of the processing system.

It has been found that the invention fully achieves the intended aim and objects.

In fact, the invention provides a handling device for handling motor vehicle, van, truck cab and metal article vessel bodyworks 30 in general, which is very simple construction wise and can operate with a very high reliability.

In particular, the handling device according to the invention allows to reduce the spaces occupied by the bodyworks 30 both in the handling and dipping operations on said bodyworks.

Thus, it is possible to use small size processing basins, with a consequent reduction of the processing fluid consumes.

In practicing the invention, the used materials, as well as the contingent size and shapes, can be any, according to requirements.

The invention claimed is:

1. A handling device for driving, dipping and turning motor vehicle bodyworks into/from processing basins, said handling device comprising a sliding framework which is slidably driven on sliding rails and supporting a pair of arm members, a first end portion of the arm members being coupled to the sliding framework and the arm members bearing, at respective other free end portions of said arm members opposed to the first end portion of the arm members, a swinging shaft having a tilting platform supporting a motor vehicle bodywork bearing skid, said sliding framework comprising either one or two winch assemblies driving a respective winding drum for winding a rope, belt, chain, coupled to a respective arm at said swinging shaft, wherein said sliding framework further comprises two racks therealong the first end portions of said arms coupled to said framework slide.

2. A handling device, according to claim 1, wherein said sliding framework comprises sliding framework wheels, including anti-tilting means applied to the rail support.

3. A handling device, according to claim 1, wherein said framework has a U-shape and supports said two racks and two winch assemblies including geared units.

4. A handling device, according to claim 1, wherein said arm members have top end portions horizontally sliding on said racks, thereby defining a reciprocating rectilinear movement.

5. A handling device, according to claim 1, wherein said arm members are associated with a rotary axis having, at end portions thereof, sliding wheels engaged in respective top guides, at said sliding wheels gear wheels engaging with said racks being arranged.

6. A handling device, according to claim 1, wherein at the other end portions thereof, said arm members support, at a junction of said ropes, a shaft of said tilting platform, which is rotatively driven with variable rotary angles, by a bevel gear pair.

7. A handling device, according to claim 6, wherein said bevel gear pair comprises a pinion gear meshing with a ring gear and being coupled with a driving shaft driven by a driving geared unit.

8. A handling device, according to claim 1, wherein said tilting platform supports a skid in turn supporting a motor vehicle bodywork to be processed in processing basin.

9. A handling device, according to claim 1, wherein said ropes, or belts, are wound on respective operating drums driven by geared units to lower said arm members and said tilting platform shaft.

10. A handling device, according to claim 1, wherein said racks always hold said arm members in a parallel relationship in an operating condition by a sliding engagement of the first end portions of the arm members along the racks.

11. A handling device, according to claim 1, wherein said sliding framework comprises sliding framework wheels, are double-wheels, including anti-tilting means applied to the rail support.

* * * * *